United States Patent [19]

Koch

[11] Patent Number: 5,154,564
[45] Date of Patent: Oct. 13, 1992

[54] PORTABLE LAUNCHER-UNLOADER FOR BOAT TRAILERS

[76] Inventor: Edward J. Koch, 4549 Barlow Dr., Bartlesville, Okla. 74006

[21] Appl. No.: 789,100

[22] Filed: Nov. 7, 1991

[51] Int. Cl.⁵ ............................................. B60P 3/10
[52] U.S. Cl. ............................... 414/506; 280/414.1; 414/529; 414/559
[58] Field of Search ............... 414/506, 485, 500, 529, 414/559; 280/414.1

[56] References Cited

U.S. PATENT DOCUMENTS

| | | | |
|---|---|---|---|
| 3,132,758 | 5/1964 | Linton | 414/506 X |
| 3,149,735 | 9/1964 | Bleecker | 414/506 |
| 3,263,845 | 8/1966 | Davidson | 414/559 |
| 3,303,952 | 2/1967 | Bissinger | 414/506 |
| 3,682,335 | 8/1972 | Smyth | 414/506 |
| 3,951,433 | 4/1976 | Starkey | 414/506 X |
| 3,971,484 | 7/1976 | Anderson et al. | 414/500 X |
| 4,050,595 | 9/1977 | Bussard | 280/414.1 |
| 4,319,862 | 3/1982 | Cook | 280/414.1 X |
| 4,946,333 | 8/1990 | Boatwright | 414/500 X |
| 5,013,206 | 5/1991 | Ernst et al. | 280/414.1 X |

*Primary Examiner*—David A. Bucci
*Assistant Examiner*—Robert S. Katz

[57] ABSTRACT

A portable device for launching-unloading a boat (24) from a boat trailer (10) wherein a winch rope snap (46) is snapped in to a boat bow eye (26) and a winch rope (36) is extended through a swivel pulley (38) attached to the rear trailer frame cross member (16) and continued forward to the launching winch (28). Upon activation of the launching winch (28) a rearward directional thrust is developed causing the boat (24) to move off of the trailer (10).

3 Claims, 3 Drawing Sheets

PORTABLE LAUNCHER-UNLOADER FOR BOAT TRAILERS

BACKGROUND

1. Field of Invention

This invention relates, in general, to boat launchers-unloaders, and more specifically, to such boat launchers-unloaders which are used to remove a boat from its means of land transportation, more commonly known as a boat trailer.

2. Description of Prior Art

Boat trailers are normally equipped with a winch device to draw the boat on the trailer once it has been launched. Few devices have been conceived to launch a boat from a trailer. Those inventions that have been conceived are very complex and very bulky to install, as well as operate.

In an effort to overcome certain shortcomings and simplify as well as improve the installation and operation of boat launchers, the following list of patents disclose design features which have been conceived.

| U.S. Pat. No. | Patentee | Issue Date |
| --- | --- | --- |
| 2,389,338 | Zorc | 11/20/1945 |
| 3,132,758 | Linton | 5/12/1964 |
| 3,149,735 | Bleecker | 9/22/1964 |
| 3,303,952 | Bissinger | 2/14/1967 |
| 3,682,335 | Smyth | 8/08/1972 |
| 3,951,433 | Starkey | 4/20/1976 |

Zorc U.S. Pat. No. 2,389,338 discloses a boat launching trailer containing a separate boat carrying dolly to transport the boat down a ramp and into the water. This device is most cumbersome, complicated and impractical with present day boats and trailers.

Linton U.S. Pat. No. 3,132,758 discloses a mobile trailer employing a cradle, in combination with an arm, to unload an object from a trailer. This device is also most cumbersome, complicated and impractical with present day boats and trailers.

Bleecker U.S. Pat. No. 3,149,735 discloses a launching device for boat trailers using the loading winch, a yoke and bridle and a combination of pulleys to launch a boat from a trailer. This device is inconvenient to the user because it would have to be assembled and attached each time it was needed since the loading winch would have last been used to load the boat and to secure the boat to the trailer for transport.

Bissinger U.S. Pat. No. 3,303,952 discloses a boat launching accessory using the loading winch to which is attached an accessory designed to conform to the prow of the boat, after which the winch rope is extended to the rear of the trailer, around the rear roller and then under the remaining rollers, back to the front of the trailer and attached to the accessory. At this point the operator is ready to remove the boat from the trailer. This method is extremely time consuming and requires the operator to lie on the ground to make the installation. Today's sportsman would not have the patience to install this device each time it was to be used.

Smyth U.S. Pat. No. 3,682,335 discloses a launching device for boat trailers. This device is similar to that of Bleecker U.S. Pat. No. 3,149,735 incorporating a yoke and bridle system of removing the boat from the trailer along with a complicated system of five or six pulleys mounted to the frame of the trailer. This system is also very complicated and requires a great deal of exposed apparatus on the trailer with which most boaters would not care to be involved.

Starkey U.S. Pat. No. 3,951,433 discloses a boat launching mechanism employing a bow plate and a double set of launching cables to launch a boat from a trailer. Again this system is very complicated and requires a cumbersome apparatus to be attached to the trailer at all times. It must also be attached to the boat in the "ready to use position" before backing the trailer into the water. It must also be attached to the boat during transport to keep tension on the cables to prevent them from dragging on the road. This system is, again, very cumbersome and complicated which detracts from its desirability.

OBJECTS AND ADVANTAGES

Accordingly, several objects and advantages of the portable boat launcher-unloader described in may above patent are:

(a) to provide a boat launcher-unloader that is simple to install and operate;

(b) to provide a boat launcher-unloader that is portable from one trailer to another with a minimum of effort, time and mechanical knowledge involved in the transfer;

(c) to provide a boat launcher-unloader that can be economically produced;

(d) to provide a boat launcher-unloader that has a variety of uses:
  (1) to launch a boat into the water.
  (2) to unload a boat on land so the trailer can be used for other hauling and utility purposes.
  (3) to move a boat rearward on a trailer to enable the boat owner to tilt the bow of the boat and trailer upward to clean out the interior of the boat with a water hose and provide adequate drainage for this procedure.

(e) to provide a boat launcher-unloader that will fit all types of boat trailers;

(f) to provide a boat launcher-unloader that will not necessitate the drilling of holes or welding of parts on the original trailer;

(g) to provide a boat launcher-unloader that will assure that one person can successfully remove the boat from its trailer;

Further objects and advantages are to provide a portable boat launcher-unloader that can be installed and used easily and conveniently by sportspersons of all ages and sexes and that will enhance the appearance of the boat trailer along with being extremely functional. Still further objects and advantages will become apparent from a consideration of the ensuing description and drawings.

DRAWING FIGURES

REFERENCE NUMERALS IN DRAWINGS

Figure 1:
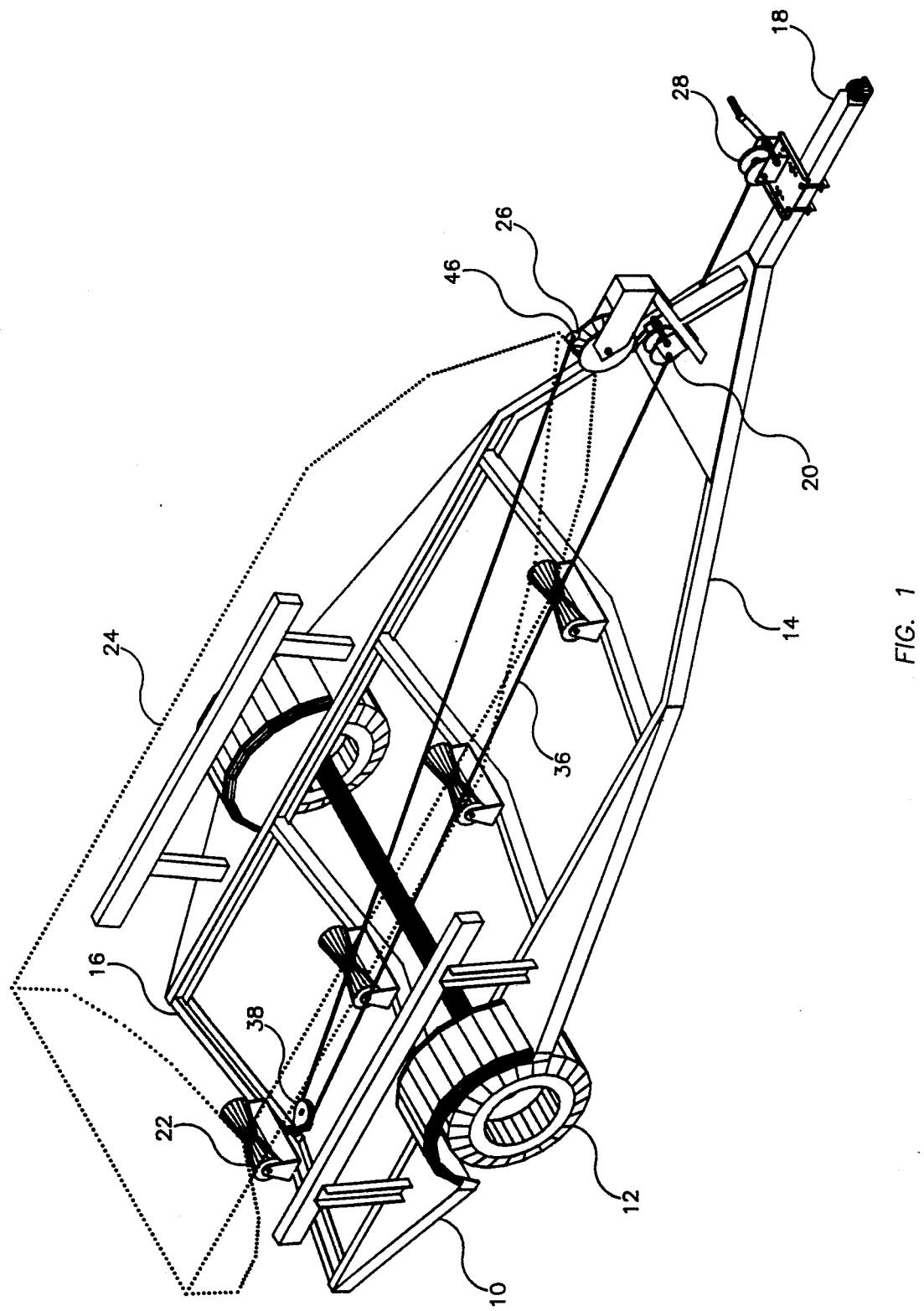
FIG. 1 is a isometric view which schematically depicts a boat trailer with a boat thereon shown in dotted lines including the launching-unloading means according to a typical embodiment of the present invention.

| 10 | boat trailer | 12 | trailer wheels and axle |
|---|---|---|---|
| 14 | trailer frame | 16 | trailer frame cross member |
| 18 | trailer tongue | 20 | boat retrieving winch |
| 22 | boat keel guide roller | 24 | boat |
| 26 | boat bow eye | 28 | launching winch |
| 30 | winch mounting plate | 32 | winch mounting plate bolt |
| 32a | winch mounting plate bolt | 32b | winch mounting plate bolt |
| 32c | winch mounting plate bolt | 34 | winch mounting plate bracket |
| 34a | winch mounting plate bracket | 36 | winch rope |
| 38 | swivel pulley | 40 | pulley bracket |
| 42 | pulley bracket mounting bolt | 42a | pulley bracket mounting bolt |
| 44 | pulley bracket mounting plate | 46 | winch rope snap |
| 48 | winch mounting plate hole | 48a | winch mounting plate hole |
| 48b | winch mounting plate hole | 48c | winch mounting plate hole |
| 50 | pulley height adjustment hole | 50a | pulley height adjustment hole |
| 52 | pulley mounting bolt | | |

DESCRIPTION—FIGS. 1-3

For the purposes of promoting an understanding of the principles of the invention, reference will now be made to the embodiment illustrated in the drawings and specific language will be used to describe the same. It will, nevertheless, be understood that no limitation of the scope of the invention is thereby intended. Such alterations and further modifications in the illustrated device, and such further applications of the principles of the invention as illustrated therein being contemplated as would normally occur to one skilled in the art to which the invention relates.

Referring to FIG. 1 of the drawings, there is illustrated boat trailer 10 which is similar in design to most boat transporting units. Trailer 10 has a set of wheels including axle 12, a frame 14, including frame cross member 16, to which is attached boat keel guide roller 22, which supports and stabilizes boat 24 on trailer 10. Further included as parts of trailer 10 is a tongue 18, to which is attached a boat retrieving winch 20. Shown in dotted lines and positioned on boat trailer 10 is boat 24, which has attached to its bow a boat bow eye 26.

Figure 2:
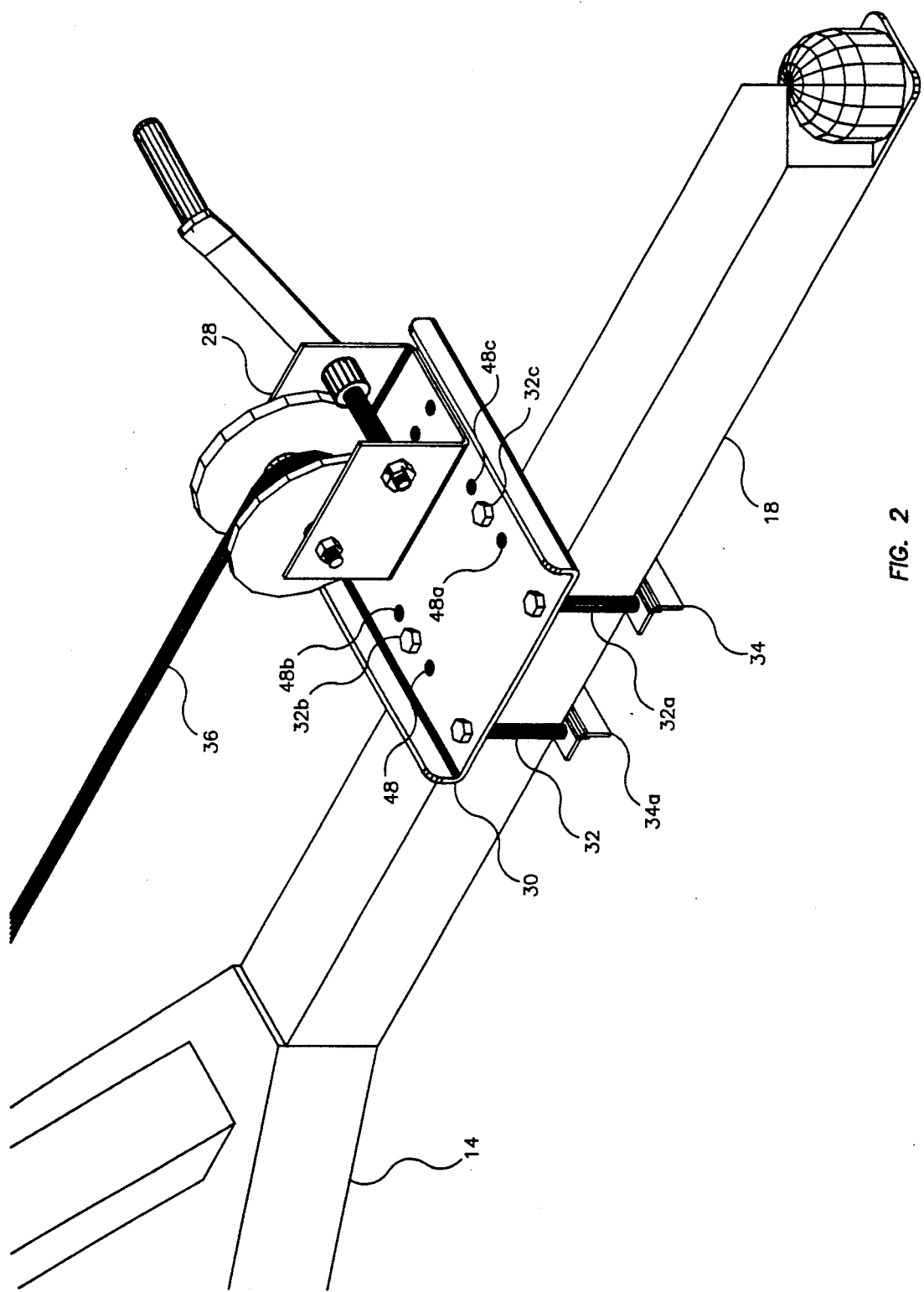
FIG. 2 is a partial isometric view of the FIG. 1 boat trailer detailing a winch and winch mounting plate which comprises a portion of the FIG. 1 boat trailer.

Further included as embodiments of the invention herein described and best illustrated in FIG. 2 of the drawings, is a separate launching winch 28, mounted to trailer tongue 18 by means of winch mounting plate 30. Winch mounting plate 30 is secured to trailer tongue 18 by means of four winch mounting plate bolts 32, 32a, 32b, 32c, and two winch mounting plate brackets 34 and 34a. This assembly is used exclusively for the purpose of launching-unloading boat 24 from boat trailer 10. The winch mounting plate 30 is made portable and adaptable for mounting to different trailer tongue 18 or frame 14 dimensions with additional holes 48, 48a, 48b and 48c. The winch mounting plate 30 also makes the portable boat launcher-unloader adaptable to all boat trailers because it sets the launching winch 28 out to the side of the boat retrieving winch 20 mounting support, enabling the winch rope 36 to clear all obstructions to the rear of boat trailer 10. Extending from launching winch 28 is winch rope 36.

Figure 3:
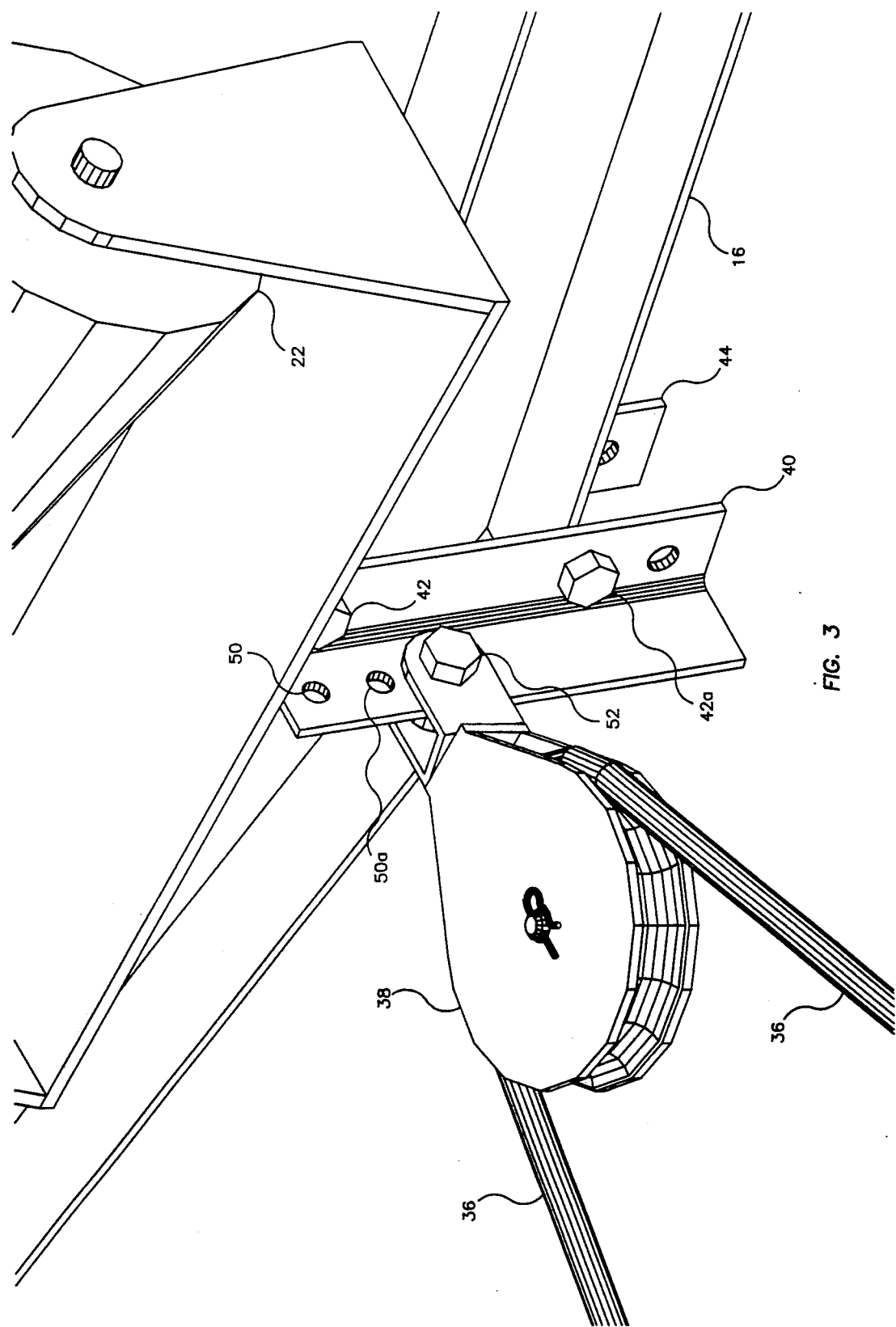
FIG. 3 is a partial isometric view of the FIG. 1 boat trailer detailing the swivel pulley and pulley bracket which comprises a portion of the FIG. 1 boat trailer.

Attached to the rear most trailer frame cross member 16, as best illustrated in FIG. 3 of the drawings, is swivel pulley 38, which is mounted on trailer frame cross member 16 by means of a pulley bracket 40. Pulley bracket 40 is secured to the trailer frame cross member 16 by means of two pulley bracket mounting bolts 42 and 42a and a pulley bracket mounting plate 44. Extending through swivel pulley 38 from portable launching winch 28 is winch rope 36. A swivel pulley 38 is used instead of a stationary pulley in this invention because the swivel pulley 38 will automatically rotate to clear all frame parts when tension is applied to winch rope 36. Swivel pulley 38 is attached to pulley bracket 40 by pulley mounting bolt 52 and can be adjusted upward or downward for clearance of other trailer parts by using pulley height adjustment hole 50 or 50a.

Attached to the loose end of winch rope 36 is winch rope snap 46 used to snap into boat bow eye 26 when activating the portable boat launcher-unloader.

OPERATION—FIG. 1-3

The launching-unloading operation embodying the principles of the invention are herein described referring to the embodiments of the invention as shown in FIGS. 1-3 of the drawings. This invention shows a manual crank winch but a power winch could also be used.

As one would prepare to launch-unload boat 24 from trailer 10 trailer 10 may be backed into water deep enough to float boat 24 after it has been launched. If boat 10 is to be unloaded on land some type of support should be placed on the ground behind trailer 10, so, that boat 24 will not rest directly on the ground.

To activate the portable launcher-unloader the operator simply snaps winch rope snap 46 into boat bow eye 26 and begins to crank launching winch 28. Tension is therefore placed on winch rope 36 as it is being wound around launching winch 28. Winch rope 36 runs through swivel pulley 38 which is attached to the rear most trailer frame cross member 16 and then winch rope 36 continues back to winch rope snap 46 which is attached to boat bow eye 26. As launching winch 28 continues to be wound the only movable object is boat 24 which moves in a rearward direction. After boat 24 clears the rear of trailer 10 and floats free, the operator moves his vehicle with trailer 10 forward out of the water. Since winch rope 36 is still attached to boat 24 the free floating boat 24 will not float away and can be beached by pulling on winch rope 36 to take on passengers.

SUMMARY, RAMIFICATIONS AND SCOPE

From the foregoing description, it is apparent that a simple, yet effective, boat launcher-unloader is provided and that the device is susceptible to modification and adjustment to be adaptable to any boat trailer combination. In addition, it is extremely simple to install with only a socket wrench and open end wrench. The device is also completely portable so that it can be transferred from one trailer to another very easily, without leaving any telltale marks on the trailer from which it has been removed.

Although the description above contains many specifications, these should not be construed as limiting the scope of the invention, but as merely providing illustrations of some of the presently preferred embodiments of this invention.

Thus the scope of the invention should be determined by the appended claims and their legal equivalents, rather than by the examples given.

I claim:

1. A boat launcher-unloader for launching a boat, comprising: a boat trailer having wheels and an axle, a frame mounted on said wheels and axle to support said boat thereon, and having a cross member transversely across the rear end of said frame, a tongue extending from the front end of said frame, a winch mounting plate mounted on said tongue extending laterally sideward for mounting a winch having a windable rope thereon, a pulley bracket attached to said cross member of said frame, and a swivel pulley pivotally attached to said pulley bracket through which said rope passes and returns to a bow eye on said boat to move said boat toward the rear of said boat trailer as tension is applied to said rope by winding said winch.

2. The boat launcher-unloader of claim 1, wherein said winch is portable and is mounted horizontally laterally sideward from said trailer tongue.

3. The boat launcher-unloader of claim 1, wherein said swivel pulley is portable and includes a separate adjustable mounting bracket.

* * * * *